(12) United States Patent
Schloesser

(10) Patent No.: US 9,936,639 B2
(45) Date of Patent: Apr. 10, 2018

(54) CONTOURED AUGER PAN

(71) Applicant: Oxbo International Corporation, Byron, NY (US)

(72) Inventor: Christopher M Schloesser, Hudson, WI (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 14/194,295

(22) Filed: Feb. 28, 2014

(65) Prior Publication Data
US 2014/0260166 A1 Sep. 18, 2014

Related U.S. Application Data

(60) Provisional application No. 61/798,936, filed on Mar. 15, 2013.

(51) Int. Cl.
*A01D 45/02* (2006.01)
*A01D 61/00* (2006.01)

(52) U.S. Cl.
CPC ......... *A01D 45/021* (2013.01); *A01D 61/002* (2013.01)

(58) Field of Classification Search
CPC .. A01D 45/021; A01D 45/028; A01D 61/002; A01D 61/004; A01D 61/006; A01D 61/008; A01D 65/04
USPC ................................................ 198/670, 671
See application file for complete search history.

(56) References Cited

U.S. PATENT DOCUMENTS

| | | | | |
|---|---|---|---|---|
| 2,426,922 A * | 9/1947 | Carroll | ................ | A01D 61/008 198/513 |
| 3,623,302 A * | 11/1971 | Schmitt | ............... | A01D 61/002 460/114 |
| 4,177,628 A * | 12/1979 | Brandt | ................ | A01D 75/287 56/2 |
| 4,429,516 A * | 2/1984 | Erickson | ............... | A01D 57/22 56/119 |
| 4,435,946 A * | 3/1984 | Erickson | ............... | A01D 57/22 56/15.6 |
| 5,784,869 A * | 7/1998 | Rayfield | .............. | A01D 45/021 460/114 |
| 6,561,896 B1 * | 5/2003 | Lauer | .................. | A01D 61/008 460/71 |
| 7,743,591 B2 * | 6/2010 | Meier | ................ | A01D 41/1271 56/14.5 |
| 2002/0174636 A1 * | 11/2002 | Calmer | ............... | A01D 61/008 56/14.5 |
| 2007/0186530 A1 * | 8/2007 | Meier | ............... | A01D 41/1271 56/14.6 |
| 2010/0281835 A1 * | 11/2010 | Tipnis | ................... | A01D 41/14 56/1 |
| 2011/0005181 A1 * | 1/2011 | Barnett | ............... | A01D 34/664 56/157 |

\* cited by examiner

*Primary Examiner* — Alicia Torres
*Assistant Examiner* — Adam J Behrens
(74) *Attorney, Agent, or Firm* — Merchant & Gould P.C.

(57) ABSTRACT

A harvester includes a cross conveying auger with a helical blade. An auger pan extends under and behind the auger and forms a trough portion below the auger. A lower rear quadrant of the auger pan is contoured includes one or more projections to provide resistance to radial movement of the ears of corn so that the ears and are moved longitudinally inward along the auger.

10 Claims, 7 Drawing Sheets

CONTOURED AUGER PAN

BACKGROUND OF THE INVENTION

Field of the Invention

The present invention relates to a pan for a grain conveying auger and in particular to a contoured pan with ridges to improve transport efficiency.

Description of the Prior Art

Harvesters such as combine harvesters for harvesting corn and other crops are well known. Such harvesters have a head that includes multiple gathering assemblies arranged side by side transverse to the direction of travel and spaced so that the harvester moves along the rows and gathers in the stalks of corn and separates the ears. The gathering assemblies generally direct the ears to a cross-conveyor such as an auger extending transverse to the direction of travel and conveying the corn towards a center conveyor for further threshing and/or storage. Such augers typically include a left side and right side rotating a continuous helical blade that engages the ears of corn and imparts a movement along the bottom of a trough formed by an auger pan toward the center.

Although such auger conveying systems generally perform satisfactorily, problems can occur. As the pan forms a generally smooth trough in prior art augers, the ears of corn may slide within the trough rather than being moved longitudinally along the auger. Therefore, the helical blade imparts both a longitudinal movement parallel to the rotational axis of the auger as well as radial lateral type movement transverse to the longitudinal axis of the auger shaft. If the auger rotates and the ears of corn simply slide upward along a smooth surface, they may fall off of the helical blade or carried over the center core and back to the bottom of the trough to be engaged by a next spiraling blade portion. However, such lifting movement decreases movement along the desired transport direction. Moreover, ears of corn may be damaged or beaten repeatedly by the rotation of the blades.

In order for the transport efficiency of such an auger to improve, the material must have some friction or resistance to sliding transverse to the longitudinal transport direction. However, such friction or resistance must not impede the motion too much as this may cause clogging or damage to the conveyed material. The present invention addresses these as well as other problems associated with efficiently transporting material along a helical auger.

SUMMARY OF THE INVENTION

The present invention is directed to a contoured auger pan that may be utilized with a harvester auger. Corn combines and harvesters include a head that may harvest multiple rows of corn at a time. The ears of corn are separated from the stalk and passed to a cross conveying auger at the rear of the head that transports the ears transversely to the direction of travel to a center position where the corn is transported rearward for threshing or further processing by the harvester.

The auger includes a rotating shaft with a continuous helical blade with the blades on the left and right side of the center of the harvester extending around the shaft in opposite directions so that rotation of the shaft directs material from both sides of the auger inward toward the center of the auger. A pan extends below and behind the auger and forms a trough below the auger in which the corn is contained while being engaged by the auger. The helical blade imparts a longitudinal and lateral force vector to the transported material. To provide resistance to material sliding along the radial direction vector applied by engagement with the spiraling helical blade, longitudinal ridges extend along the rear quadrant of the trough section of the pan. One or more structures, such as bumps or ridges extend radially inward and provide resistance to radial movement of the ears of corn so that the helical blade of the auger more efficiently moves the ears along the auger towards the center of the harvester.

In one embodiment, two projections are placed in the lower rear quadrant below the center of curvature of pan and behind the lowest position of the trough. It can also be found that a single projection also provides benefits for preventing sliding of the ears of corn in a radial direction. The ridges may be flattened peaks or bumps and continuous or spaced apart as long as sufficient resistance to sliding is provided. The projections must extend inward only slightly so that they do not block the ears of corn and must extend far enough to provide sufficient resistance to the radial movement of the ears of corn. As the ears are engaged by the helical blade and pushed upward and longitudinally inward, the upward movement is resisted by the projections so that the vector along the auger axis is maintained and the ears of corn are more efficiently directed to the center of the harvester.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
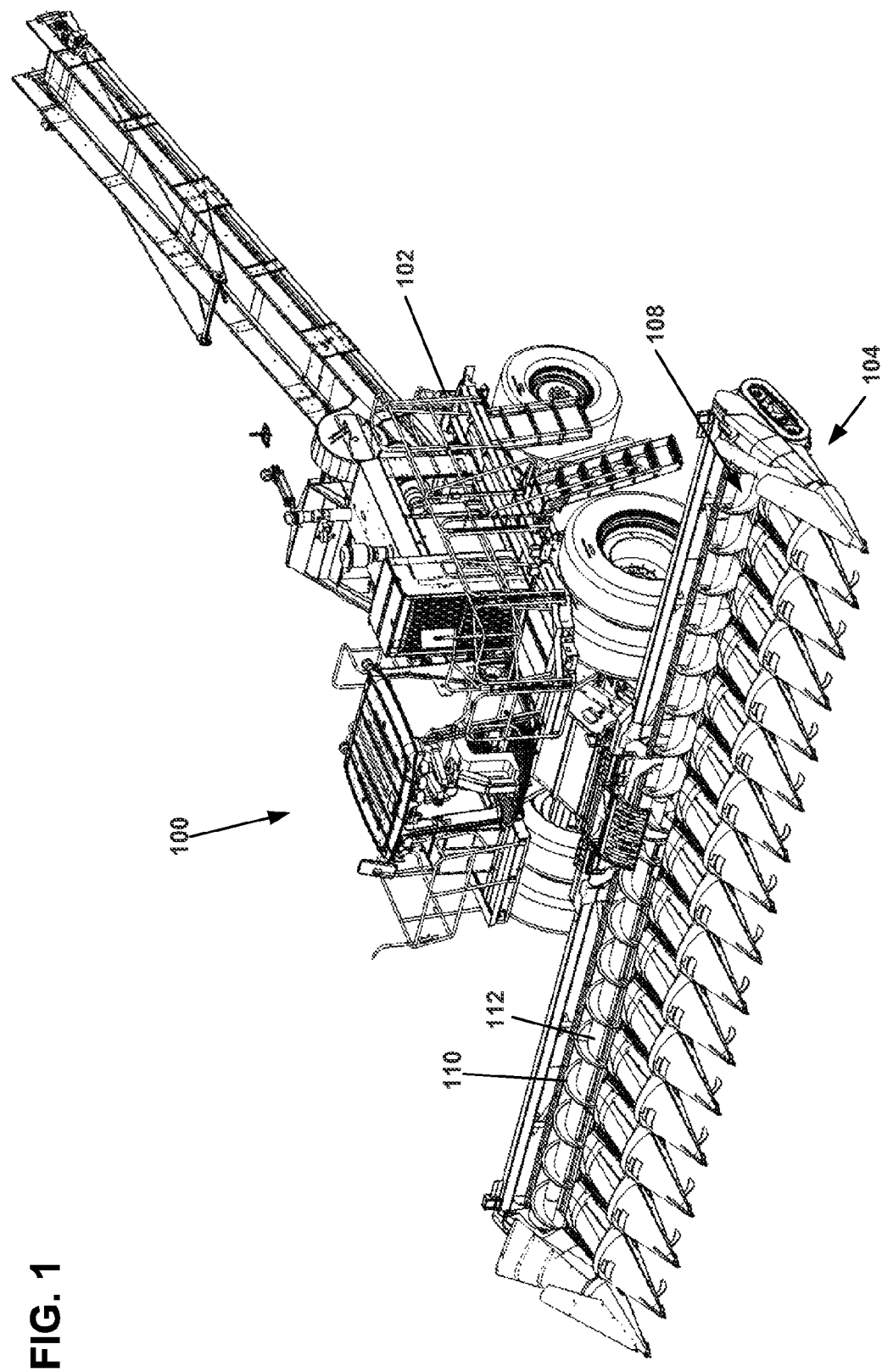
FIG. 1 is a perspective view of a harvester according to the principles of the present invention.
Figure 2:
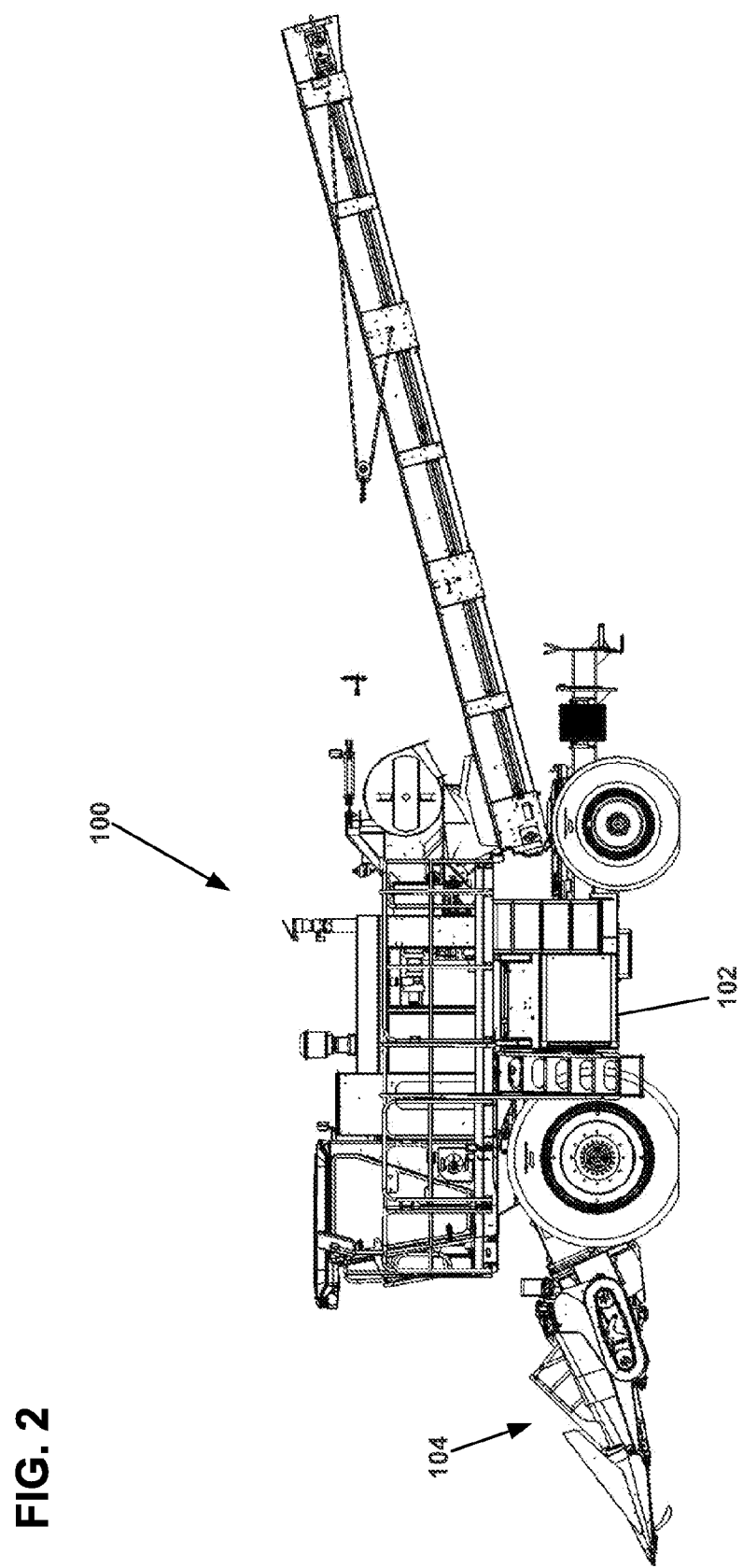
FIG. 2 is a side elevational view of the harvester shown in FIG. 1.
Figure 3:
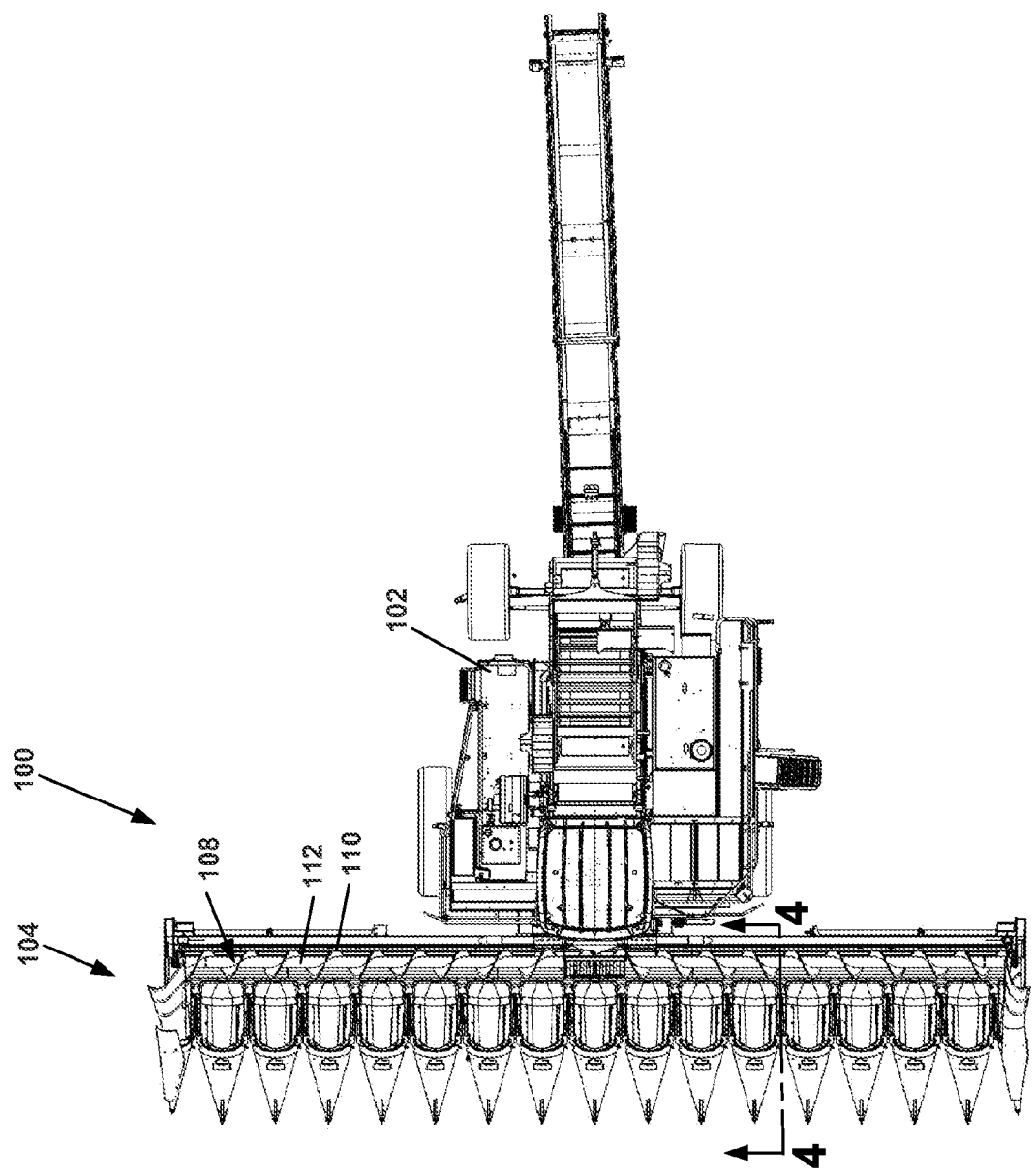
FIG. 3 is a top plan view of the harvester shown in FIG. 1.

Referring now to the drawings and in particular to FIGS. 1-3, there is shown a harvester (100) such as may be utilized for harvesting corn or other crops. The harvester (100) includes a chassis (102) and a head (104). The head (104) is at the front of the harvester with transversely spaced apart gathering assemblies (106) aligned with the rows. As the harvester (100) travels along the rows, it removes and gathers ears of corn and separates them from the corn stalks.

The harvested crop is generally transported from the head (104) inward to the center of the head (104) by a cross conveyor, generally configured as a rotary auger (108)

extending generally horizontally and transverse to the direction of travel. The auger (108) includes a helical blade (110) and a center core or shaft (112) about which the auger (108) rotates. The auger (108) includes a left side helical blade and a right side helical blade that wind around the center shaft in opposite directions. Therefore, upon rotation of the auger (108) in one direction, the blades push material toward the center.

Figure 4:
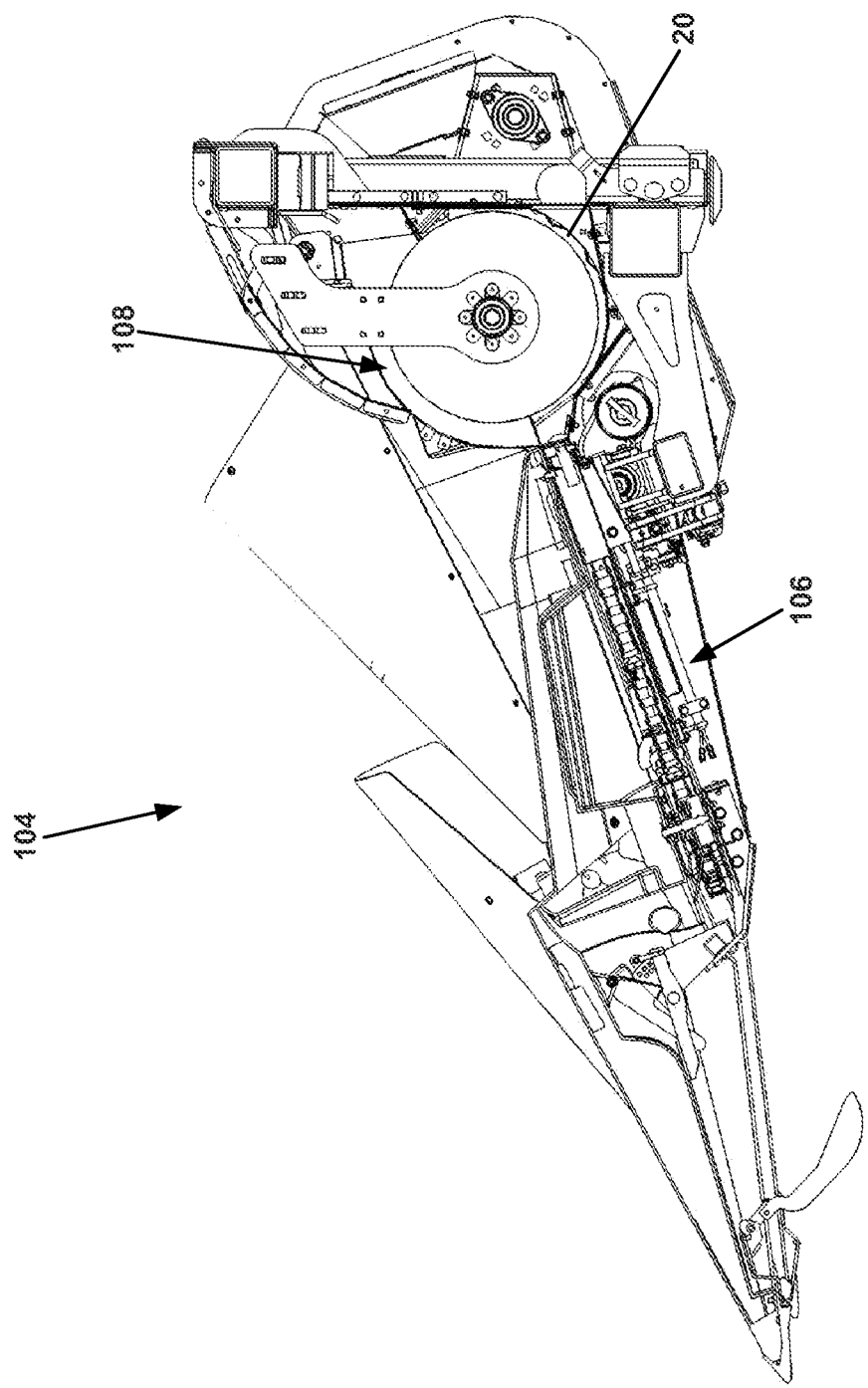
FIG. 4 is a cross-sectional view of a head for the harvester taken along line 4-4 of FIG. 3.

As shown in FIG. 4, a gathering assembly (106) directs the corn rearward to the auger (108). The auger (108) includes a pan (20) extending generally below and to the rear of the auger (108).

As used herein, the term "longitudinal" refers to a direction running generally along the length of the auger (108) parallel to the shaft (112) and rotational axis of the auger (108). The terms "lateral" and "laterally" refer generally to a direction transverse to the longitudinal direction. The terms "radial" and "radially" refer to a direction extending relative to a point at or near a center of curvature of a generally curved section of the pan (20) or from the core or shaft (112) of the auger (108).

Figure 5:
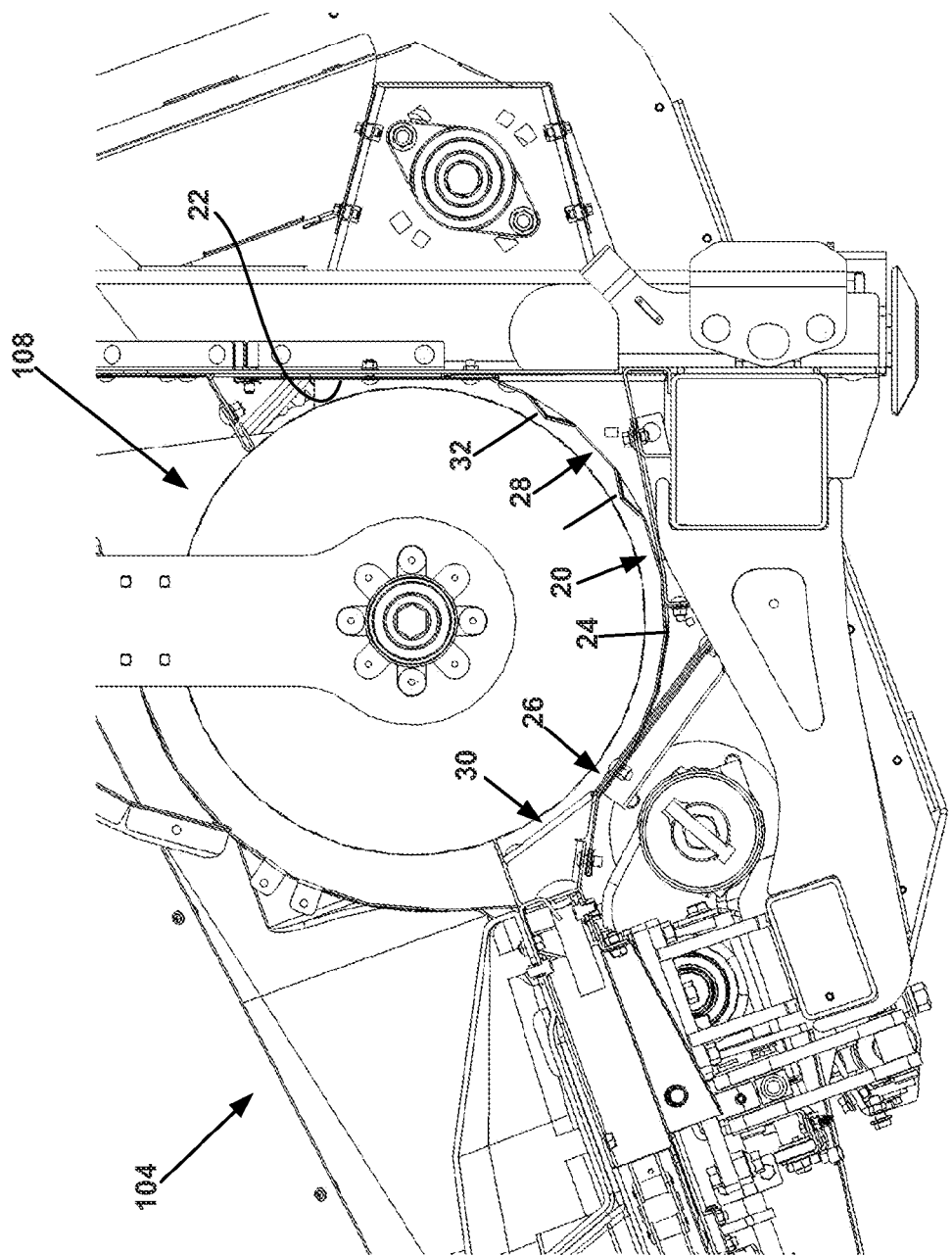
FIG. 5 is a sectional detail view of a portion of the head shown in FIG. 4.
Figure 6:
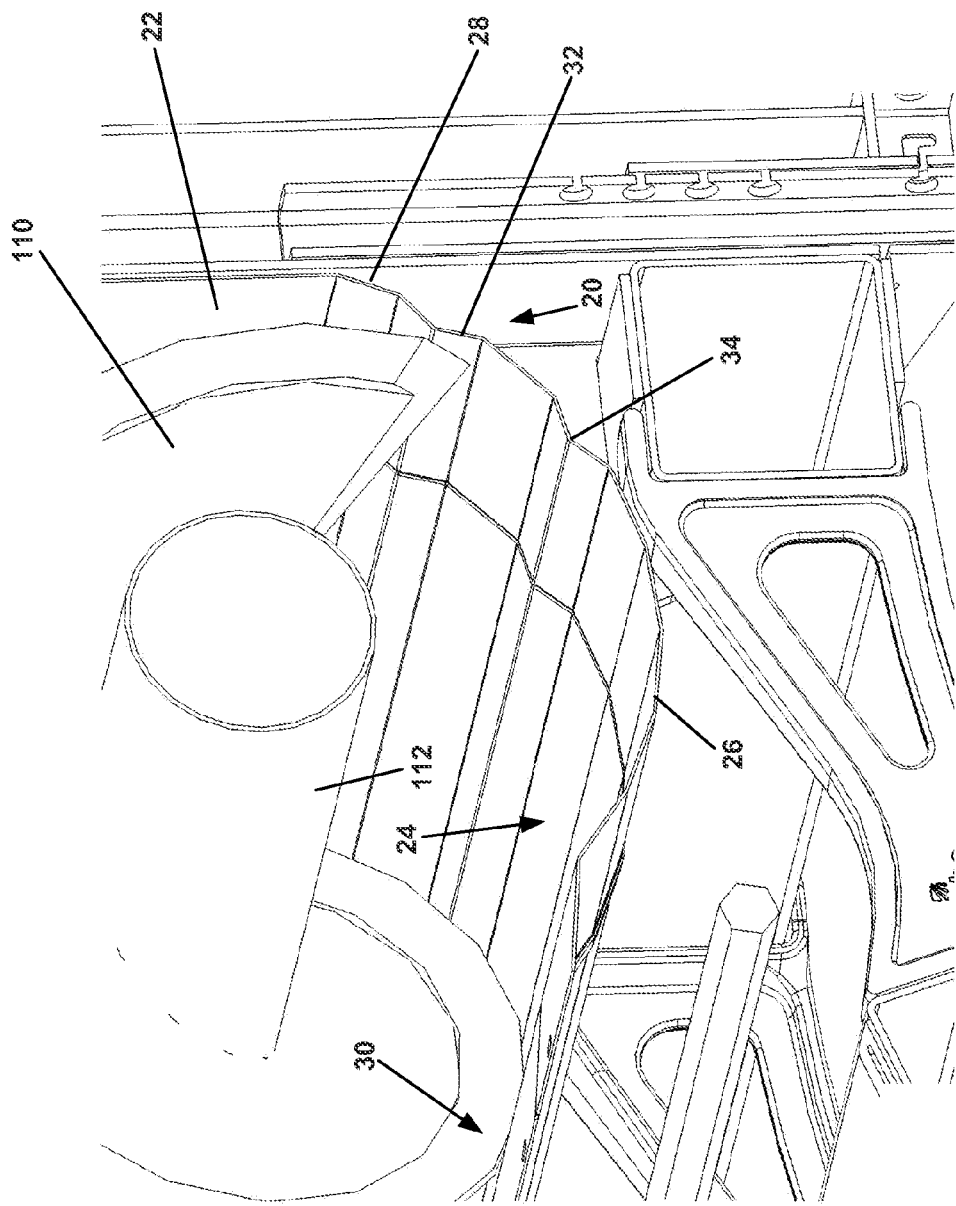
FIG. 6 is a perspective view of a portion of the auger and auger pan for the auger shown in FIG. 5.
Figure 7:
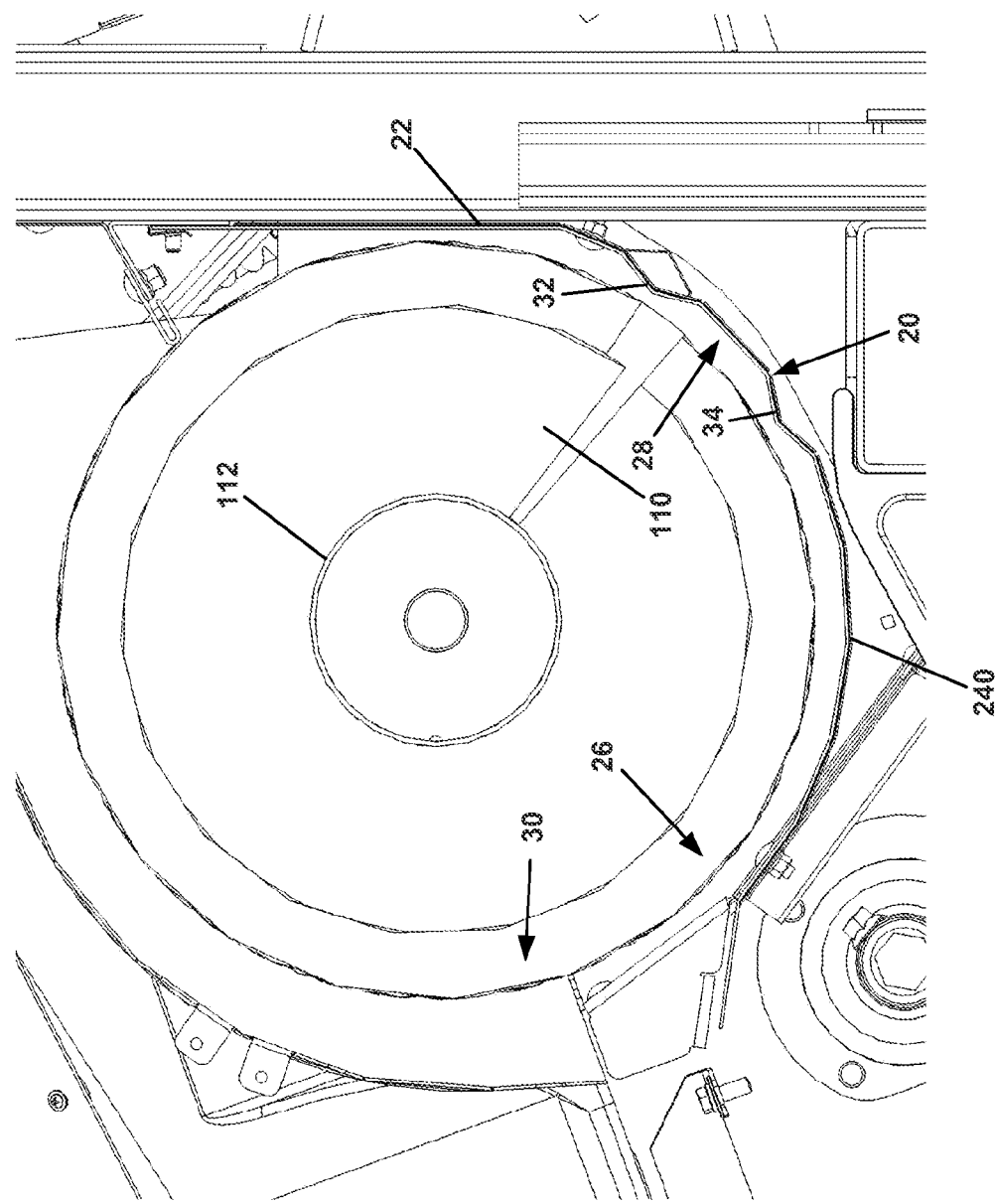
FIG. 7 is an end view of the auger and auger pan shown in FIG. 6.

Referring to FIGS. 5-7, the auger pan (20) has a rear wall (22) and a lower generally upward curving trough section (24). The trough section (24) includes a front quadrant (26) and a rear quadrant (28). The corn enters the auger through a front entry (30) above the upper edge of the front quadrant portion (26) of the pan (20). The auger pan (20) includes one or more projections extending radially inward and generally positioned at the rear quadrant (28). In the embodiment shown, the pan (20) includes two radially inward extending ridges including an upper ridge (32) and a lower ridge (34). The ridges (32) and (34) extend longitudinally along the length of the auger pan and around the auger (108). Although the pan (20) is shown with two ridges (32) and (34) it can be appreciated that the present invention may also include a single ridge or more than two ridges. The projections are shown as being flattened radially inward extending peaks but the angle may be sharper or shallower. Moreover, the projections may also be rounded bumps or flanges or other radially inward extending structures that provide a level of lateral/radial resistance to the material being transported. The pan (20) may also be configured with other contours such as radially outward extending ridges that resist lateral or radial movement and promote movement of materials longitudinally along the auger (108).

In operation, the separated ears of corn are delivered from the gathering assembly (106) rearward through the entry (30) of the auger (108) and fall into the trough (24) of the auger pan (20). As the auger (108) rotates, the helical blade (110) generally urges the ears of corn along a lower trough portion (24) of the pan (20). In order for the helical blade (110) to efficiently move the ears, the ears must have some lateral/radial resistance or the helical blade lifts the ears upward until the ears slide off the blade or are lifted over the shaft (112) and fall back to the bottom of the trough (24) with little movement longitudinally along the length of the auger (108) towards the center of the head (104). However, by adding inward projecting contours (32) and/or (34), the ears of corn engage the ridges (32) and (34) are then pushed by the blade (11) while the ridges (32) and (34) prevent sliding up the rear quadrant (28) and/or rear wall (22). Ears of corn engaging either of the ridges when engaged by the helical blade (110) have a lateral or radial force component as well as a longitudinal force component from engagement by the angled surface of the helical blade (110). However, the projections (32) and (34) impede radial movement of the ears of corn. Therefore, the longitudinal component acts on the ears of corn and the helical blade (110) moves the ears along the auger (108) towards the center of the harvester (100). It can be appreciated that although the ridges (32) and (34) extend radially inward, a balance must be struck between extending too far in and causing clogging, and not extending inward far enough, in which case the ears would simply slide over the ridges and not move efficiently along the length of the auger towards the center.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A conveying system, comprising:
   an auger having a rotational axis extending along a longitudinal direction and including a center shaft and a helical blade;
   a pan extending under and behind the auger, the pan comprising:
      a trough portion beneath the auger, the trough portion defining a lower section with a generally upward curving radial surface, the generally upward curving radial surface being at a substantially constant distance from the rotational axis;
      a first ridge projecting radially inward and extending along the longitudinal direction at a rear section of the trough portion;
      a second ridge projecting radially inward extending along the longitudinal direction at the rear section of the trough portion and spaced apart along the trough portion from the first ridge with a flat, planar section of the trough portion positioned intermediate the first ridge and the second ridge;
      wherein the first ridge and the second ridge project radially inward from the generally upward curving radial surface toward the rotational axis and are spaced equidistant from the auger.

2. A conveying system according to claim 1, further comprising a rear wall portion extending upward from a rear upper edge of the trough portion.

3. A conveying system according to claim 2, wherein the rear wall portion extends upward to a height at least even with the center shaft.

4. A conveying system according to claim 1, wherein the first ridge forms an inward projecting peak.

5. A conveying system according to claim 1, wherein the first ridge and the second ridge form inward projecting peaks.

6. A harvester head, comprising:
   a plurality of transversely spaced apart gathering assemblies;
   an auger proximate the plurality of gathering assemblies, the auger having a rotational axis and extending along a longitudinal direction and including:
   a center shaft and a helical blade;
   a pan extending under and behind the auger, the pan comprising:
      a trough portion beneath the auger, the trough portion defining a lower section with a generally upward curving radial surface extending from beneath the auger rearward and upward, the generally upward curving radial surface being at a substantially constant distance from the rotational axis;

a first radially inward projecting ridge and a second radially inward projecting ridge extending along the longitudinal direction at a rear section of the generally upward curving radial surface of the trough portion, the second radially inward projecting ridge being parallel and spaced apart along the pan from the first radially inward projecting ridge with a flat, planar section of the trough portion positioned intermediate the first ridge and the second ridge, wherein the first ridge and the second ridge are spaced equidistant from the auger.

7. A harvester, comprising:

a chassis;

a plurality of gathering assemblies configured in a side-by-side arrangement transverse to a direction of travel of the harvester;

an auger proximate the plurality of gathering assemblies, the auger having a rotational axis and extending along a longitudinal direction transverse to the direction of travel of the harvester, the auger including:

a center shaft and a helical blade;

a pan extending under and behind the auger, the pan comprising:

a trough portion beneath the auger, the trough portion defining a lower section with a generally upward arcing surface extending generally rearward and upward, the generally upward arcing surface being at a substantially constant distance from the rotational axis;

a radially inward projecting first ridge and a radially inward projecting second ridge extending along the longitudinal direction at the arcing surface of the trough portion, the radially inward projecting second ridge being parallel and spaced apart along the trough portion from the radially inward projecting first ridge; a flat, planar section of the trough portion positioned intermediate the first ridge and the second ridge, wherein the first ridge and the second ridge are spaced equidistant from the auger.

8. A conveying system according to claim 1, wherein the generally upward curving radial surface of the lower section extends from the rear wall portion to a point below the auger.

9. A harvester head according to claim 6, further comprising a rear wall portion extending upward from a rear upper edge of the upward curving radial surface of the trough portion.

10. A harvester according to claim 7, further comprising a rear wall portion extending upward from a rear upper edge of the upward arcing surface of the trough portion.

* * * * *